Oct. 5, 1937.   C. F. M. VAN BERKEL   2,095,043
SLICING MACHINE
Filed Dec. 17, 1934

Inventor:
Cornelis F. M. van Berkel
By Cox & Moore atty

Patented Oct. 5, 1937

2,095,043

UNITED STATES PATENT OFFICE 2,095,043

SLICING MACHINE

Cornelis F. M. van Berkel, Wassenaar, Netherlands, assignor to U. S. Slicing Machine Company, La Porte, Ind., a corporation of Indiana Application December 17, 1934, Serial No. 757,791
In Great Britain December 19, 1933

10 Claims. (Cl. 146—94)

This invention relates to slicing machines in general, and particularly to slicing machines employing slice stacking mechanism.

The primary object of the invention is to provide means controlled by the reciprocal movement of the carriage for continuously rotating a drum type conveyor in a counterclockwise direction.

Another object of the invention is to provide clutch or freewheeling mechanism in combination with driving means, whereby slice stacking mechanism may be driven in a single direction regardless of the reciprocal movement of the carriage.

Numerous other objects and advantages will be apparent throughout the progress of the following specification.

The accompanying drawing illustrates a selected embodiment of the invention and the views therein are as follows.

Figure 1:
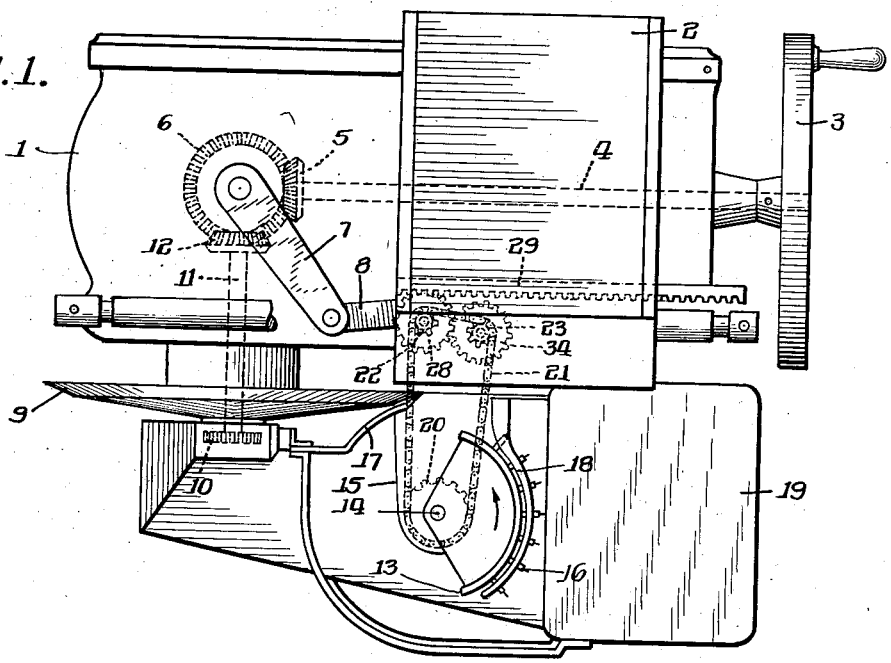
Fig. 1 is a detail plan view of one form of the slicing machine and embodying the invention.

The slicing machine herein shown for the purpose of illustration is of the reciprocating type and includes a stationary base 1 upon which there is mounted a carriage 2 adapted to be reciprocated from one end of the base to the other. The carriage 2 may be reciprocated in any convenient known manner but is herein shown as being operated by a turnable flywheel 3 connected to the carriage 2 through suitable mechanism. A flywheel shaft 4 is operatively connected to the base and has a beveled pinion 5 engaging a crown-wheel 6. The crown-wheel 6 is connected to a central shaft to which there is also connected a crank 7. A link 8 is operatively connected to the crank 7 and to the carriage whereby the carriage is reciprocated back and forth upon rotation of the flywheel 2.

A slicing machine knife 9 is rotated upon rotation of the flywheel 3 through the intermediary of a well known chain drive construction 10, a countershaft 11 and a pinion-wheel 12 which engages the crown-wheel 6. A substance feed, not shown, and which may be of any well known type, is adapted to feed substance on the carriage toward the slicing plane of the machine.

Figure 2:
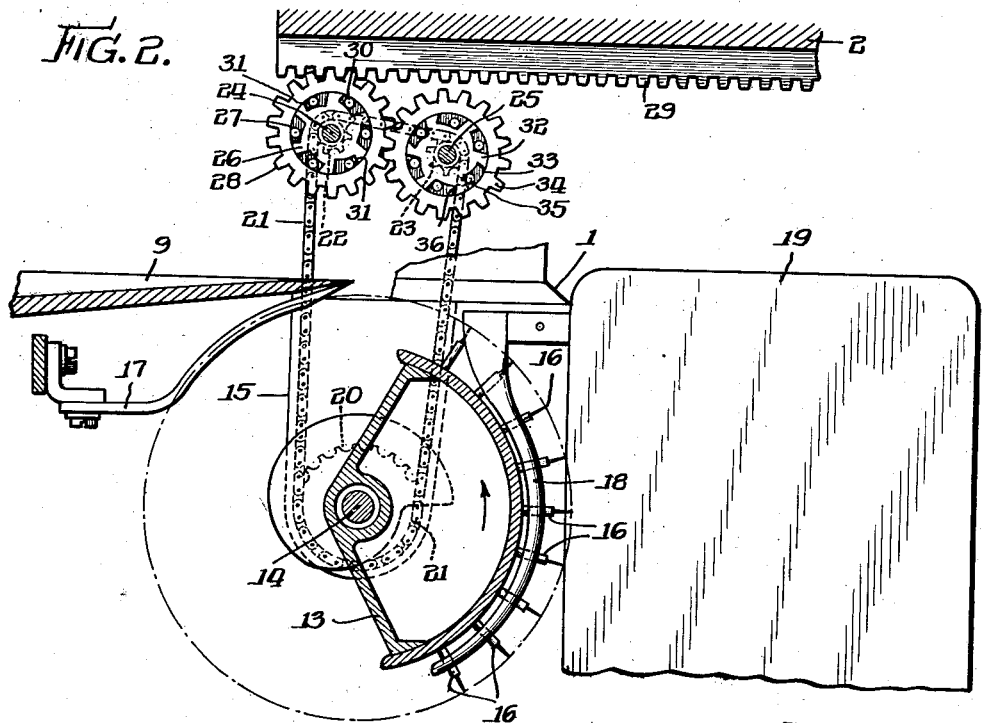
Fig. 2 is a detail plan section drawn on a larger scale.

Slice stacking mechanism is provided for stacking the slices as they are cut by the knife, and this mechanism includes a movable conveyor 13 which, as shown, is of the drum type. This stacker or segmental drum 13 is secured to a vertical shaft 14 which is journalled in a stationary bracket 15 secured to the base 1. The conveyor or drum 13 is provided with rows of prongs 16 which are arranged to cooperate with a deflector plate 17 positioned behind the knife 9. A discharge fly 18 is arranged for removing the impaled slices from the prongs 16 and depositing them on a slice receiving tray or table 19. The construction and arrangement of the slice stacking mechanism is such that during cycles of operation of the slicing machine, the conveyor drum 13 will rotate in a counterclockwise direction. During the rotative movement of the drum, the prongs 16 thereon will engage and impale a slice as it is being cut and convey the slice past the deflector 17 where the slice will be pressed into firm engagement with the prongs. When the conveyor or drum 13 reaches the position directly opposite the slice receiving tray 19, the discharge fly 18 will operate to remove the slice from the prongs and deposit it upon the tray or table 19. It is imperative and necessary that the drum rotate in timed relationship with the movement of the carriage, and means are, therefore, provided to cause the drum to be operated during reciprocal movement of the carriage. The means for operating the drum in timed relationship with the carriage may comprise a chain-wheel 20 which is secured to the drum shaft 14. A driving chain 21 passes around the wheel 20 and around a pair of chain-wheels 22 and 23. The chain-wheels 22 and 23 are secured to their respective shafts 24 and 25 which are journalled side by side on the base 1 below the carriage 2. A driven element 26 of a one-way clutch or gear-wheel 28 meshes with a rack 29 which is secured to the reciprocatory carriage 2. Cooperation between the elements 26 and 27 takes place through the intermediary of a series of rollers 30 which are located in recesses formed in the periphery of the element 26. The material surrounding a part of each recess is inclined at 31 as clearly shown in Fig. 2.

A driven element 32 of a one-way clutch or flywheel device is rigidly secured to the shaft 25. A driving element 33 which forms part of a gearwheel 34, meshes with the gearwheel 28. Cooperation between the elements 32 and 34 takes place through the intermediary of a series of rollers 35 which are located in recesses formed in the periphery of the element 32, the material surrounding a part of each recess being inclined at 36 as clearly shown in Fig. 2. The construction and operation of the drum conveyor operating mechanism is such that both gearwheels 28 and 34 will rotate always in opposite directions, the movement of each being reversed upon reverse movement of the carriage. The driving elements 32 and 33, therefore, will always rotate in alternately and mutually opposite directions.

During the movement of the carriage in a direction away from the operator which is during the slicing stroke, the gearwheel 28 will be rotated in a counterclockwise direction. When so rotated, the rollers 30 will become wedged in their respective recesses 31 with the result that the shaft 24 and the chain-wheel will be constrained to rotate in a counterclockwise direction. During this operation, the gearwheel 34 will rotate idly in a clockwise direction as the rollers 33 will be lying inoperative in their recesses 36. During the return movement of the carriage, the gearwheel 34 will receive the counterclockwise rotation and the rollers 35 will become operative, thereby causing the chain-wheel 23 to rotate counterclockwise. This counterclockwise rotation of the chain will be imparted to the parts 24, 14 and 21 and cause the drum to rotate in counterclockwise direction. During such latter operation, the gearwheel 28 will be rotating in a clockwise direction but as an idler wheel because the rollers 30 will be lying inoperative in their recesses 31. Therefore, when the carriage 2 is moved away from the operator during a slicing stroke, the carriage 2 will move from the right to the left, Fig. 2. This movement of the carriage will cause the gearwheel 28 to rotate counterclockwise and the clutch mechanism will cause the shaft 24 to rotate with the result that the chain 21 will be moved in a counterclockwise direction. The shaft 24 will rotate in a counterclockwise direction, but the driving pinion 23 will have no effect on the chain, the gearwheel 34 rotating merely as an idler pulley. During the return movement of the carriage, the parts will be reversed. The gear 28 will be the idler wheel and the gear 34 will be the driving gear. The chain 21, therefore, will always be driven in a counterclockwise direction, and due to the connection of the chain to the driving wheel 20, the drum 13 will always be driven in a counterclockwise direction. The driving elements 26 and 32 of the one-way clutch devices are alternately brought into unidirectional driving connection with the conveyor.

The parts are constructed and arranged and located with respect to each other so that during a stroke of the carriage 2, the radial dimensions of the conveyor and the dimensional relationships between the gearwheels 28 and 34 and the chain-wheels 22 and 23, and between the chain-wheels 22 and 23 and the chain-wheel 20, are such that the prongs 16 will move at the same linear speed as the speed of the carriage. The parts are so correlated that the conveyor will perform one complete revolution for each complete fore-and-aft movement of the carriage. The movement of the conveyor, therefore, is always in close accord with the movement of the carriage. If desired, however, the dimensional relationship of the parts can be re-arranged to produce a varying conveyor prong speed during the return stroke which differs from the varying speed produced during the slicing stroke. Regardless of which construction is used, it is preferable, however, that the prongs move at the same varying linear speed as the carriage.

The invention provides relatively simple positively operating means for driving slice stacking mechanism in proper timed relationship with the movement of the carriage. The construction herein disclosed and described is relatively simple, operates efficiently and positively and is not likely to get out of order.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. A slicing machine comprising a knife, means for operating the knife, a carriage adapted to be reciprocated, a conveyor adapted to be rotated, and an operative connection between the conveyor and the carriage, said connection being characterized by a pair of alternately operative drives respectively including one-way clutches whose driving elements are arranged to rotate in alternately and mutually opposite directions.

2. A slicing machine comprising a knife, means for operating the knife, a stacker and means for operating said stacker, said last named means comprising a pair of alternately operative drives each including one-way clutches, said clutches being constructed and arranged to rotate in alternately and mutually opposite directions.

3. A slicing machine comprising a reciprocal carriage, a rack on said carriage, a pinion meshing with said rack, a second pinion meshing with the first pinion, a shaft for each of said pinions, clutches for causing rotation of a driving member with a respective pinion upon movement of the carriage in a predetermined direction, a chain driven by said members, and a conveyor driven by said chain.

4. In a slicing machine having a reciprocal carriage, a rotary knife and slice conveying mechanism for conveying slices, the combination with means for operating the conveyor comprising a rack rigidly mounted on the reciprocal carriage, mechanism operated by the rack, said mechanism comprising two flat intermeshing gears, shafts for said gears, clutches for locking a gear to its respective shaft upon movement of the carriage in a predetermined direction, and a chain operated by the shafts and driving the conveyor.

5. In a slicing machine having a reciprocal carriage, a rotary knife and slice conveying mechanism for conveying slices, the combination with means for operating the conveyor comprising a rack rigidly mounted on the reciprocal carriage, mechanism operated by the rack, said mechanism comprising two flat intermeshing gears, shafts for said gears, clutches for locking one of said gears to its respective shaft upon movement of the carriage in one direction and the other of said gears to its shaft upon movement of the carriage in an opposite direction, and mechanism driven by said shafts to operate the conveyor.

6. In a slicing machine having a reciprocal carriage, a rotary knife, and a slice conveyor for conveying slices, the combination with means for operating the conveyor and comprising a rack on the carriage, mechanism operated by the rack including a gear meshing with the rack, a shaft upon which said gear is freely mounted, clutch mechanism for locking the gear to the shaft when the gear is rotated in one direction by movement of the carriage in one direction, a second gear in engagement with the first gear, a second shaft upon which said second gear is freely mounted, a second clutch mechanism for locking the second gear to the second shaft when the second gear is rotated in an opposite direction by movement of the carriage in an opposite direction, a chain operated in one direction by said shafts upon movement of the carriage in either direction, and a gear on said conveyor in engagement with said chain.

7. In a slicing machine having a reciprocal carriage, a rotary knife and a slice conveyor for conveying slices, the combination with means for operating the conveyor, a rack on the carriage, mechanism operated by the rack and including a gear meshing with the rack, a shaft upon which said gear is freely mounted, clutch mechanism for locking the gear to the shaft when the gear is rotated in one direction on movement of the carriage in one direction, a second gear in engagement with the first gear, a second shaft upon which said second gear is freely mounted, a second clutch mechanism for locking said second gear to the second shaft when the second gear is rotated by the first gear upon movement of the carriage in an opposite direction, a chain operated by said shafts in a single direction upon movement of the carriage in either direction, and means operated by the chain for rotating the conveyor.

8. In a slicing machine having a reciprocal carriage, a rotary knife and a conveyor for conveying slices, the combination with means for operating the conveyor, a rack, mechanism operated by the rack rigidly mounted on the reciprocal carriage and comprising a gear meshing with the rack, a shaft upon which said gear is freely mounted, means for locking the gear to the shaft when the gear is rotated in a counterclockwise direction by movement of the carriage during the slicing stroke, a second gear in engagement with the first gear, a second shaft upon which the second gear is freely mounted, means for locking the second gear to the second shaft when the second gear is rotated by the first gear upon the return movement of the carriage, and means operated by said shafts for driving the conveyor.

9. In a slicing machine having a reciprocal carriage, a rotary knife and a conveyor for conveying slices, the combination with means for operating the conveyor, a rack on the carriage, mechanism operated by the rack and comprising a gear meshing with the rack, a shaft upon which said gear is freely mounted, means for locking the gear to the shaft when the gear is rotated in a counterclockwise direction by movement of the carriage during the slicing stroke, a second gear in engagement with the first gear, a second shaft upon which the second gear is freely mounted, means for locking the second gear to the second shaft when the second gear is rotated by the first gear upon the return movement of the carriage, means operated by said shafts for driving the conveyor, said last named means comprising a chain driven by said shafts, and a gear operatively connected to the conveyor in engagement with the chain.

10. A reciprocatorially actuated rotary mechanism adapted to be used in a device such as a slicing machine stacker drive, comprising a pair of intermeshing gears, a pair of sprockets, each one of said sprockets being operatively associated with one of said gears respectively through a clutch mechanism, each of said clutch mechanisms being so arranged that the sprockets will both be driven in the same direction, and a drive chain associated with said sprockets.

CORNELIS F. M. van BERKEL.